H. FRANCIS.
MILLING AND THE LIKE CUTTER.
APPLICATION FILED MAY 15, 1918.
1,278,629.
Patented Sept. 10, 1918.
5 SHEETS—SHEET 1.
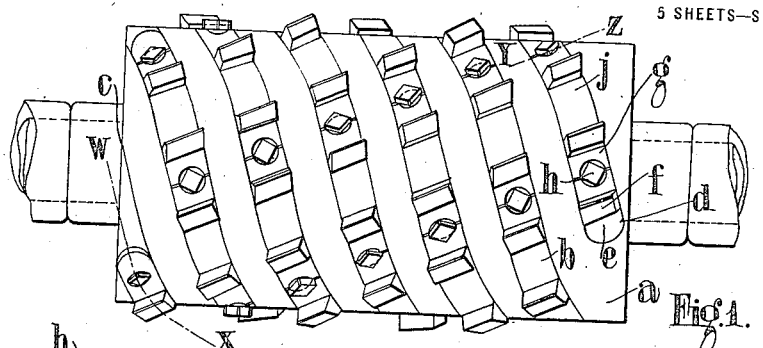
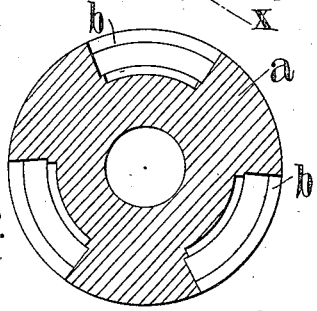
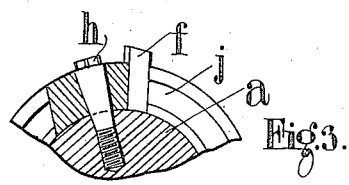
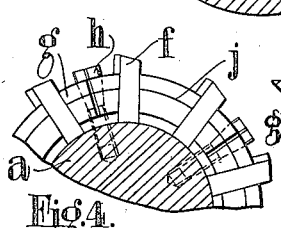 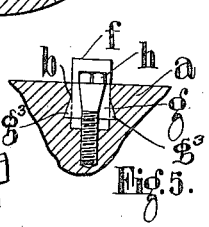 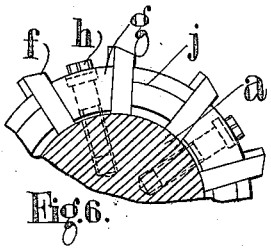 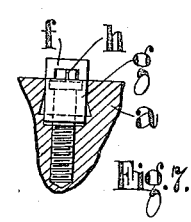
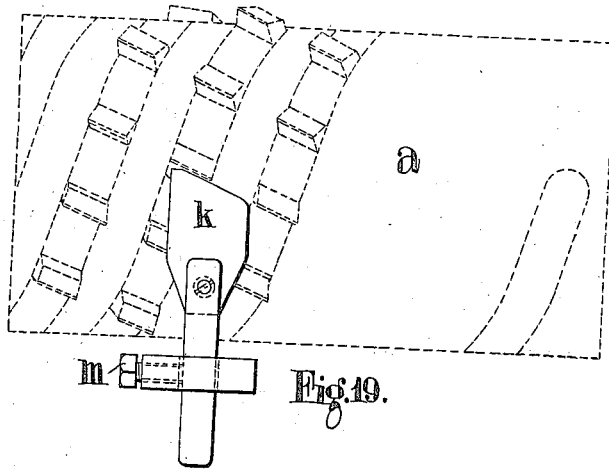
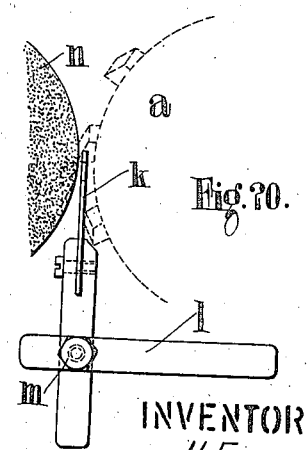
INVENTOR
H. Francis.
BY H. R. Kerslake
ATTORNEY H. FRANCIS.
MILLING AND THE LIKE CUTTER.
APPLICATION FILED MAY 15, 1918.
1,278,629.
Patented Sept. 10, 1918.
5 SHEETS—SHEET 2.
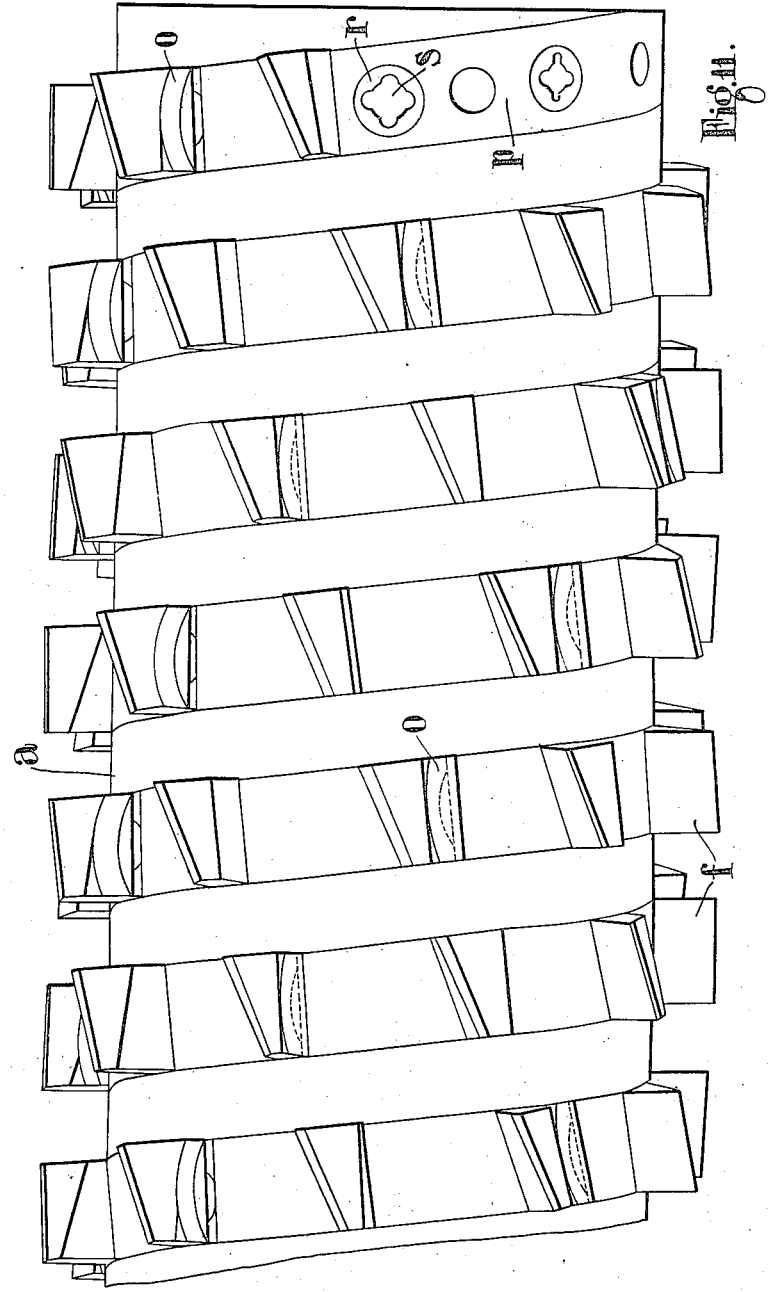
INVENTOR
H. Francis
BY H. R. Kerslake
ATTORNEY

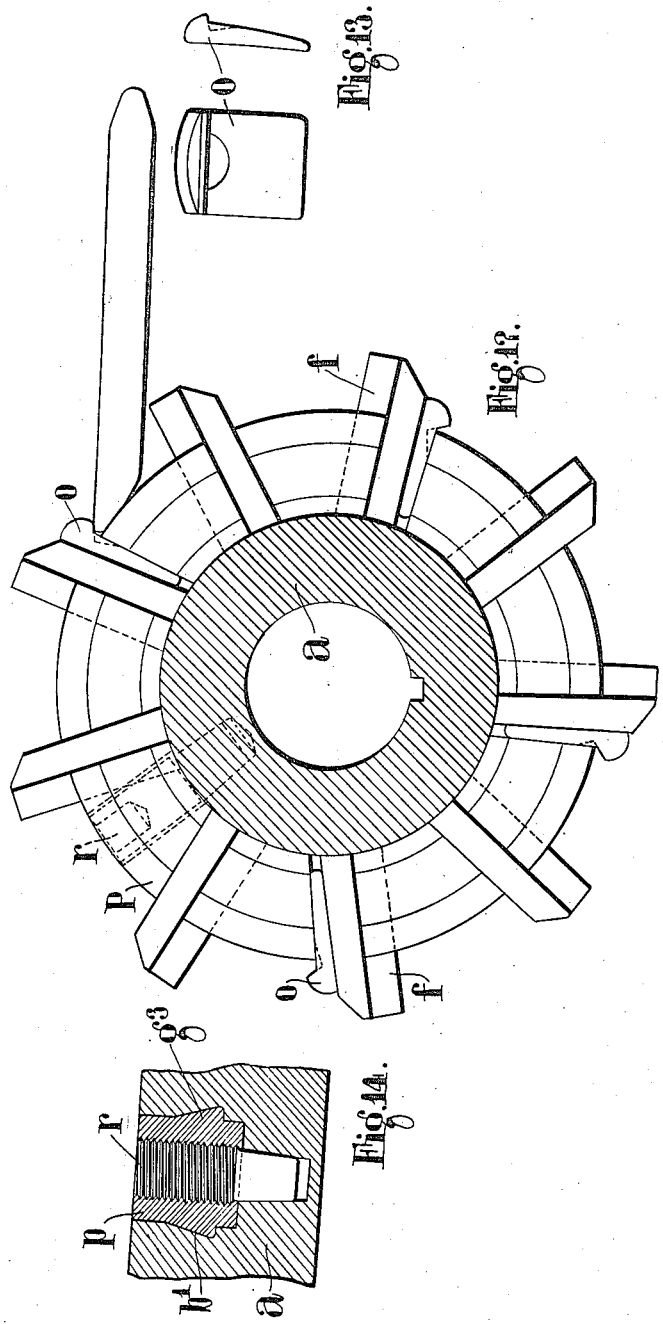

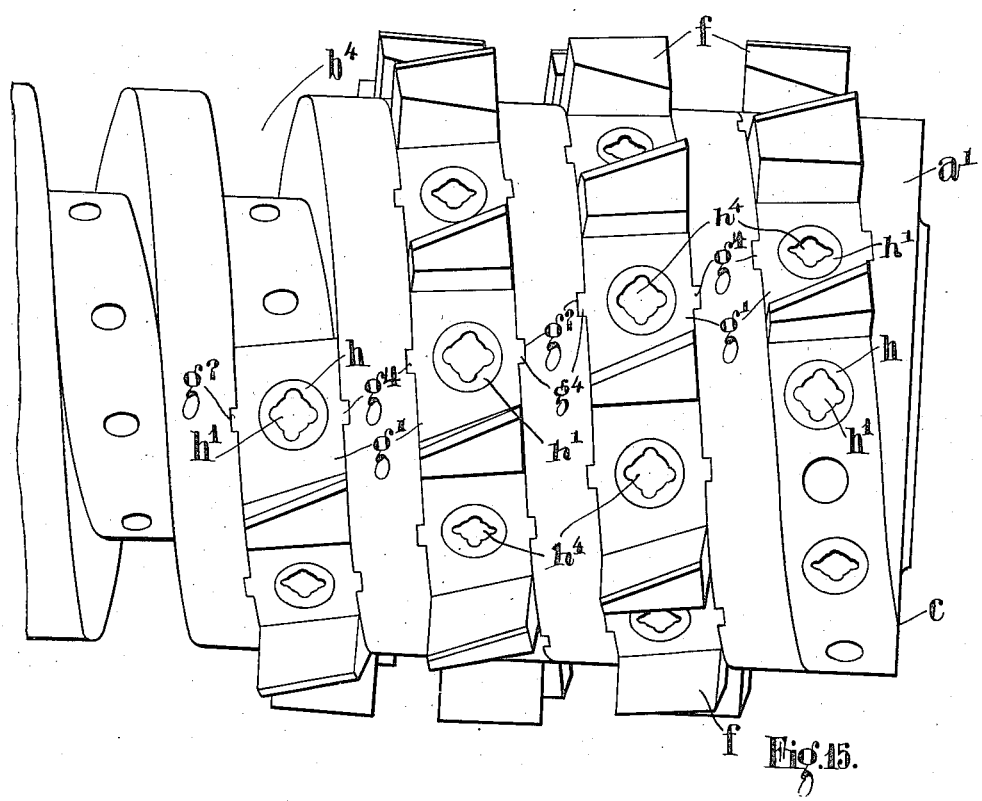

H. FRANCIS.
MILLING AND THE LIKE CUTTER.
APPLICATION FILED MAY 15, 1918.
1,278,629.
Patented Sept. 10, 1918.
5 SHEETS—SHEET 5.
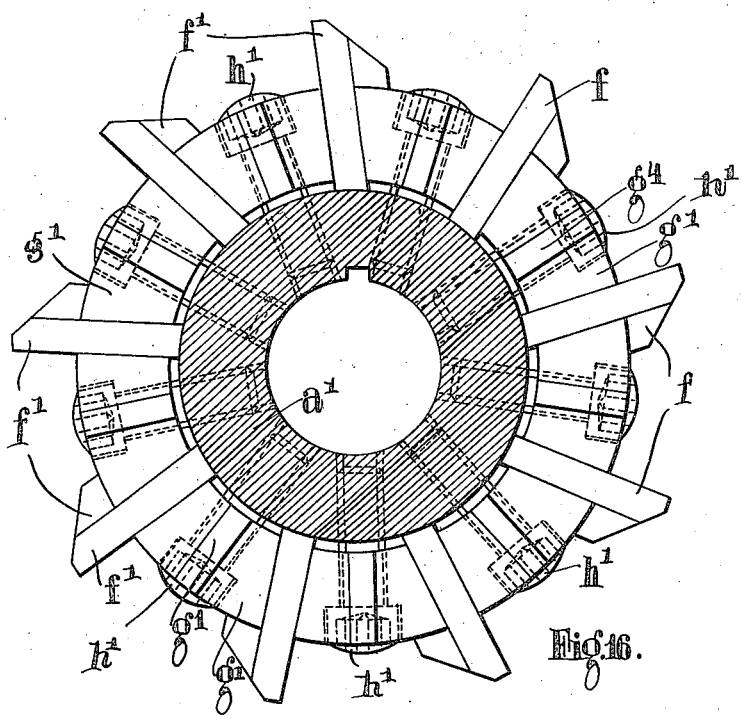
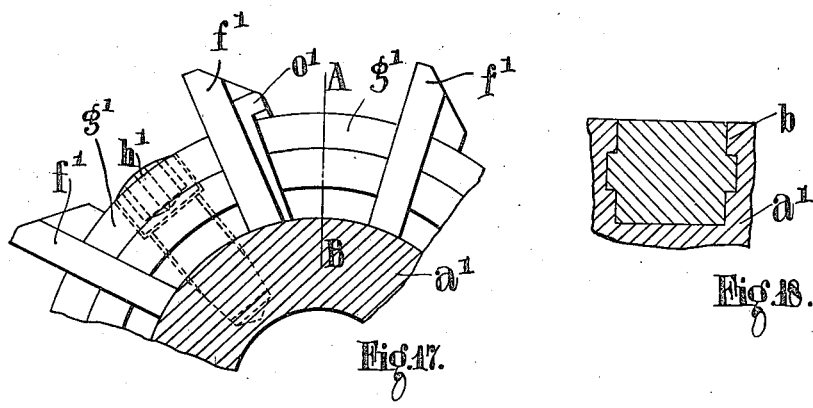
INVENTOR
H. Francis
BY H. R. Kerslake
ATTORNEY

UNITED STATES PATENT OFFICE.

HENRY FRANCIS, OF LONDON, ENGLAND.

MILLING AND THE LIKE CUTTER.

1,278,629.  Specification of Letters Patent.  Patented Sept. 10, 1918.

Application filed May 15, 1918. Serial No. 234,773.

*To all whom it may concern:*

Be it known that I, HENRY FRANCIS, a subject of the King of Great Britain and Ireland, and residing at 32 Ormiston road, Shepherd's Bush, London, W., England, have invented certain new and useful Improvements in and Relating to Milling and the like Cutters, of which the following is a specification.

This invention relates to milling cutters of the inserted tooth type in which for the accommodation of the cutter teeth and intervening blocks, one or more helical grooves are provided in a cylindrical cutter body.

According to the invention, the helical grooves provided in the cylindrical body are such as can be cut by means of a screw cutting lathe.

Preferably, the spacing blocks, formed so as to cause the teeth between which they are inserted to move apart, are secured to the cylindrical body by means of screws, the blocks being, for instance, adapted to be drawn down by the screws.

Alternatively, spacing blocks which are split and are adapted to be expanded by the insertion of long taper headed screws serving to secure the distance pieces to the cylindrical body, may be employed in accordance with the invention.

The invention also comprises a milling cutter provided with helical grooves such as can be cut by means of a screw cutting lathe, in which the teeth and intervening blocks are secured in the grooves by means of wedges.

The invention further consists in the improved milling cutter with inserted teeth substantially as hereinafter described.

In some cases the cutters may be slightly tapered at the back so as to be thicker at the root, the wedge-blocks and distance pieces then being shaped correspondingly. This is done when it is desired to give additional security against the teeth being dislodged radially outward.

The teeth may be staggered in any formation by having surplus holes for the taper wedge-screws and using extra packing or resistance pieces where necessary. In this way it can be arranged that not more than one, two, or any desired number of teeth are active at the same time, while the aggregate effect is that of a plain cutter. The driving torque may thus be kept uniform and low.

The grooves in the cutter body may have any suitable cross-section, they may, for instance, be of trapezoidal or rectangular cross-section.

A convenient method of producing the wedge-blocks and the distance pieces is to cut a helical belt from a cylindrical shell in a screw-cutting lathe in a manner similar to that in which the grooves in which these pieces are to fit are cut. This belt is then sawed into short lengths of the requisite dimensions.

The distance pieces and the wedge-blocks are made in short lengths and the latter may be of the same form in cross-section as is the groove. The teeth can be inserted at the places they are to occupy. The elements are disposed in the following order: tooth, pair of wedge-blocks, tooth, distance piece, tooth, pair of wedge-blocks, and so on, until the entire groove is filled.

The accompanying drawings are furnished for the purpose of illustrating, by way of example, a suitable method of carrying the invention into effect.

Figure 1 is an elevation of a milling cutter with teeth, distance pieces and wedge-blocks in position;

Fig. 2 is a cross-section of the grooved cylindrical body;

Fig. 3 is a section on the line W—X of Fig. 1;

Fig. 4 is a fragmentary view showing a developed cross-section of the cutter with the teeth, distance-pieces and wedge-blocks in place;

Fig. 5 is a fragmentary view on the line of section Y—Z of Fig. 1;

Fig. 6 is a fragmentary view showing a developed cross-section of a cutter provided with teeth, distance pieces and an alternative method of securing the wedge-blocks;

Fig. 7 is a fragmentary view bearing the same relation to Fig. 6 as the Fig. 5 bears to Fig. 4;

Fig. 8 illustrates in detail the alternative form of wedge-blocks and the screw serving to secure the block to the body;

Figs. 9 and 10 show in cross-section and in elevation a tooth;

Fig. 11 is an elevation of a cutter in which wedges are employed to secure the teeth in position in the grooves;

Fig. 12 is a cross-section of the same in which the method of withdrawing the wedges is shown;

Fig. 13 represents the wedge in front and side elevation;

Fig. 14 is a fragmentary section in line of Fig. 12 showing a form of block inserted in the under cut groove together with the screw employed for holding the block in position;

Fig. 15 is a side elevation of a portion of a cutter in which blocks provided with fins or projections engaging in corresponding channels in the cutter body are employed for securing the teeth;

Fig. 16 is a corresponding cross-section; while

Fig. 17 is a cross-section of a fragment of a cutter of yet another form; and

Fig. 18 is a section on the line A—B of Fig. 17;

Figs. 19 and 20 serve to illustrate a suitable method of grinding the teeth of the cutter.

Referring to Figs. 1 to 14 of the drawings, $a$ represents the body of the cutter $b$, the grooves therein provided with an open end at $c$ and a dead end at $d$. A block $e$ is slid into the groove and forms the abutment for the first tooth $f$ which is held in position by the wedge block $g$ which is secured to the shell by the screw $h$, the next tooth is inserted in the groove and then a distance piece $j$ is inserted, after which another tooth is inserted and then a wedge-block is secured in position against the tooth. The insertion of teeth distance pieces and wedge-blocks is then continued until the desired portion of the length of the groove is filled.

In the construction shown in Figs. 1 to 5, taper-headed screws are employed for securing the wedge-blocks in position, and the blocks employed are split so that the taper-headed screw forces apart the divided portions of the block.

In the construction shown in Figs. 6, 7 and 8, the wedge-block is made solid and the screw $h$ as it is tightened up forces the block down toward the shell and thus causes it to bear against the teeth. In this construction as will be observed, the wedge-blocks are made of rather greater depth than are the distance pieces, and in this case, as will be observed, their cross-sectional form is not the same as that of the groove.

Referring to Figs. 11 to 13, the wedges employed are indicated by $o$, these wedges are accurately machined and are then bent as shown in the drawing and spring tempered. When driven in between a wedge block and a tooth the wedge is straightened.

Between certain teeth, for instance, at every complete turn of the helical groove a block $p$ may be inserted as shown in Fig. 14, and by means of the screw $r$ provided with a depression of the form shown at $s$ in Fig. 11 for the accommodation of a key, such blocks as well as the end blocks may be secured in position.

Referring to Figs. 15–16, $a'$ represents the body of the cutter provided with a groove $b^4$, $f'$ the teeth, $g'$ the spacing blocks or distance pieces provided with fins $g'$ adapted to engage in the radially disposed slots or channels $g^2$ in the walls of the grooves, while $h'$ indicates the screws provided in their heads with depressions $h^4$ of the form shown, for the accommodation of the key or tool employed for securing the wedge blocks or distance pieces or certain of them in position. After the distance pieces $g'$ and the teeth $f'$ are inserted in the groove, the block $g'$ is secured in the groove by the screws.

In the construction shown in Figs. 15 and 16, the wedge-blocks or distance pieces are all secured in position by the screws $h'$, but in the construction shown in Fig. 17, only one wedge-block in each turn of the helical groove is secured by a screw, wedges $o'$ being inserted between the other wedge-blocks and their adjacent teeth in order to secure them.

The groove in the cutter of which a fragment is illustrated in Fig. 3, has a cross-section of the form illustrated in Fig. 5, and by means of the screw indicated by $h$ in the former figure, which screw engages with a thread in the associated wedge block or distance piece and enters a taper hole in the cutter body, the block may be forced outward and thus the upper side of the fins $g^3$ may be caused to bear against the upper wall of the channel $b'$.

In the construction shown in Figs. 15 and 16, the screws pass through holes in the distance pieces and engage holes tapped in the body of the cutter, consequently by means of these screws the distance pieces or wedge blocks may be drawn downward and in this way they may be caused to force the teeth apart and thus wedge them in position.

Figs. 19 and 20, as above stated, indicate a suitable method of grinding the teeth of the cutter. The cutter being secured in a suitable holder, the spade-shaped stop $k$ supported on the arm $l$ secured to some fixed portion of the holder is brought against the tooth to be ground and secured in position by the screw $m$. The tooth is then brought into contact with the grinding wheel $n$ with which it is maintained in contact until the necessary amount of metal has been removed, after which other teeth are brought into contact with the wheel.

The milling cutter may be formed by milling or turning one or more helical grooves in a cylinder and then taking a tube of mild steel, the outer diameter of which is equal to that of the cylinder and the inner diameter of which is equal to the diameter of the body at the base of the grooves. This tube is placed on a mandrel and is secured thereto by screws inserted in holes bored and tapped to correspond with holes in the body. The tube is then milled or turned in the same way as the body and in this way a helix or helices of metal will be formed which may be sawed up into pieces of the requisite length and ground to form the distance pieces and wedge-blocks. The distance pieces and wedge-blocks may then be case hardened and finished to the desired dimensions.

Among the advantages offered by a milling cutter made as herein described are:—

(1) Milling cutters of the inserted tooth type can by this construction be made of much smaller diameter than hitherto as well as of large diameters, so that the range extends from the largest size down to as small a diameter as three inches;

(2) The teeth being of rectangular form can be made from stock sizes of steel;

(3) The quantity of tool steel required for a milling cutter of any size is reduced to the minimum.

Having now described my invention, what I claim as new and desire to secure by Letters Patent is:—

1. A milling cutter comprising a cylindrical body provided with a helical groove, spaced cutters mounted in said groove, and means engaging the teeth and adapted to move the same apart for securing the teeth in said grooves.

2. A milling cutter comprising a cylindrical body provided with helical grooves, teeth provided in said grooves, wedge blocks located between the teeth for forcing the same apart, and means for securing the wedge blocks to the body.

3. A milling cutter comprising a cylindrical body provided with helical grooves having radially disposed channels arranged in the side walls thereof, teeth located in the grooves, and spacing blocks mounted in the grooves between the teeth and having projections which engage the walls of said channels for preventing movement of the blocks along the grooves.

4. A milling cutter comprising a cylindrical body having helical grooves, the radially disposed walls of said grooves being provided with channels, teeth located in said grooves, wedge blocks located in the grooves and having projections which engage the walls of the channels, said blocks also engaging the teeth for moving the same apart, and means for securing the blocks to said body.

5. A milling cutter comprising a cylindrical body provided with a circumferentially extending groove in its periphery, spaced cutters mounted in said groove, and blocks located between said cutters for securing the same in the grooves, said cutters in operation exerting their thrust upon said blocks and longitudinally of the groove whereby the walls of the groove are relieved of the thrust from the cutters.

In testimony whereby I have signed my name to this specification.

HENRY FRANCIS.